United States Patent
Wasche et al.

(10) Patent No.: US 6,335,044 B1
(45) Date of Patent: Jan. 1, 2002

(54) METHOD FOR TREATING AND PROCESSING LUPINE SEEDS CONTAINING ALKALOID, OIL AND PROTEIN

(75) Inventors: Andreas Wasche, Langenbach; Wolfgang Holley, Bruckberg; Thomas Luck, Munich; Till Nurrenbach, Dachau; Axel Borcherding, Munich, all of (DE)

(73) Assignee: Fraunhofer Gesellschaft zur Forderung Derangewandten Forschung E.V., Munich (DE)

( * ) Notice: Subject to any disclaimer, the term of this patent is extended or adjusted under 35 U.S.C. 154(b) by 0 days.

(21) Appl. No.: 09/529,161
(22) PCT Filed: Oct. 8, 1998
(86) PCT No.: PCT/DE98/02982
§ 371 Date: May 15, 2000
§ 102(e) Date: May 15, 2000
(87) PCT Pub. No.: WO99/17619
PCT Pub. Date: Apr. 15, 1999

(30) Foreign Application Priority Data

Oct. 8, 1997 (DE) .......................................... 197 44 469
Mar. 25, 1998 (JP) .......................................... 198 13 207

(51) Int. Cl.[7] ............................ A23L 1/20; A23L 1/211; A23J 1/14
(52) U.S. Cl. ....................... 426/430; 426/431; 426/457; 426/634
(58) Field of Search ................................. 426/634, 430, 426/457, 431

(56) References Cited

PUBLICATIONS

Soybean Utilization. Published 1987. Authors: Snyder et al. pp. 82–85.*
Journal of the American Oil Chemists' Society. vol. 59. No. 5 Published May, 1982. Authors: Ortiz et al. pp. 241–244.*

* cited by examiner

*Primary Examiner*—Anthony J. Weier
(74) *Attorney, Agent, or Firm*—Antonelli, Terry, Stout & Kraus, LLP

(57) ABSTRACT

A method treating and processing alkaloid-, oil- and protein-containing lupine seeds for the production of lupine seed products by selective fractioning. The invention involves the steps of crushing and/or shaping the lupine seeds to form platelet-shaped flakes, indirect introduction of heat into the platelet-shaped flakes, with water being largely excluded, to deactivate enzymes contained in the lupine seeds, de-oiling of the platelet-shaped flakes by introduction of a solvent for obtaining lipids and lipid-reduced flakes, disembitterment of the lipid-reduced flakes by an aqueous disembitterment process for obtaining an alkaloid-reduced refined product and an aqueous extract.

32 Claims, 2 Drawing Sheets

METHOD FOR TREATING AND PROCESSING LUPINE SEEDS CONTAINING ALKALOID, OIL AND PROTEIN

BACKGROUND OF THE INVENTION

1. Field of the Invention

The invention relates to a method of treating and processing alkaloid-, oil- and protein-containing lupine seeds for the production of lupine seed products by means of selective fractioning.

2. Prior Art

Proteins are considered to be raw materials for the food and food-processing industries and are used for many applications in industrial chemistry, for instance for the production of adhesives, emulsions for photographic layers, as well as cosmetics; just to enumerate some of them.

As proteins are an essential component in animals and plants, they are renewable native raw materials which can be produced on an industrial scale, e.g. from milk, soy beans and wheat. Lupine seeds, which resemble soy beans in their composition in view of protein level, crude fiber percentage and oil percentage, are of particular importance for protein production. Lupine cultivation and the processing of lupine seeds for producing the desired protein products is therefore particularly interesting because lupines can be cultivated in regions which are not appropriate for soy beans, such as Western Europe or Australia.

A direct use of lupine products, specifically for food applications, is restricted on account of naturally occurring bitter principles, caused by so-called alkaloids, and in case of the so-called bitter lupines, which are expedient from a cultivation point of view, are entirely precluded. When lupine seeds are processed, it is therefore necessary to eliminate the alkaloids in order to obtain products for use as food. At the same time, the extracted alkaloids can be selectively used as active components in agriculture and pharmacy, which renders the complete utilization of lupines or bitter lupines, respectively, extremely interesting also from an economic viewpoint.

From the German Patent DE 537 265, which was published in 1931, a method is apparent for the useful utilization of lupines with disembitterment removes bitterness by stepwise extraction with aqueous solutions. Disembitterment is performed by staged extraction in a wet condition from lupine chips, with the addition of an acid and subsequent dissolution of the salts formed in the acid bath.

Moreover, WO 83/00419 discloses a method of and a device for elimination of the bitter principles from bitter-lupine seeds, according to which the lupines in a most finely ground form are subjected to a rinsing with lupine extract solutions of different concentrations, with application of the counter-current principle, with water being used as solvent.

An improved method of disembitterment of lupine seeds is disclosed in WO 97/12524, which provides for an initial shredding of the lupine seeds to form grits-like granules having diameters between 200 and 600 $\mu$m, and then a thermal processing of the plant seeds, which achieves a selective deactivation of enzymes present in the plant seeds. The thermal influence is produced directly by means of a blanching technique, i.e. the direct introduction of hot steam into the crushed seeds. Following the blanching operation the plant seeds are subjected to a disembitterment process comprising two steps, whereof the first extraction step results in the separation of the alkaloids and other non-nutritive substances. To this end the plant seeds are mixed with fresh drinking wafer as solvent in an acidic medium using counter-current extraction. The mixing operation can preferably be performed in goveral stages until an extract enriched with non-nutritive substances and an extractable refined product is produced which is rich in proteins and roughage. The refined product produced from the first extraction step is added, in a second step, with water as solvent in an alkaline medium. A result of the extraction in the second step is both a refined product enriched with roughage and a protein milk enriched with proteins.

All the aforedescribed disembitterment processes are based on a common objective, i.e. firstly the production of proteins in the purest form possible, and secondly obtaining roughage disembittered as completely as possible for the food or food processing industries.

The aforedescribed methods entail, however, also various inherent disadvantages: on the one hand, plant seeds, and specifically lupine seeds, have an oil percentage of roughly 10 to 15%, which contains not only pure oil such as triglycerin but also lipophilic secondary constituents such as carotinoids, lecithins or lipophilic alkaloids. The latter constituents, in particular, cannot be sufficiently extracted by the known disembitterment processes so that the disembittered final products unavoidably contain lipophilic alkaloid residual components.

Even though the known method according to WO 97/12524 provides for a deactivation of the enzymes present in the plant seeds, which precedes the disembitterment process, the occurrence of an enzymatic oxidation of present unsaturated fatty acids during storage of the disembittered products can be precluded, which fatty acids would, for instance, give rise to a rancid flavor, which is undesirable for use in the food sector. However, the deactivation is performed by way of blanching, which means that the plant seeds are subjected to hot steam, which, even though the enzymes are deactivated, is unavoidably detrimental thereto and also to accumulation proteins such that they lose their native form and properties.

Eventually, the shaping of the crushed lupine seeds contributes as well to the success of the disembitterment process. The grits granule shape proposed in WO 97/12524, for instance, is inexpedient insofar as it encompasses a comparatively large volume from which the individual constituents to be extracted must be eliminated, which means that the substances to be extracted can leave the grit-shaped lupine seed components to be disembittered more difficult the greater the distance is from the interior of the volume to the outside of each grits granule. On the other hand, it is proposed in WO 83/00419 to grind the lupine seeds to be disembittered to form ultra-fine meal having a granularity between 1 $\mu$m and 50 $\mu$m, which, however, gives rise to problems in terms of process engineering when the liquid and solid phases are separated, on account of the fine grinding of the lupine seeds for producing a meal, even though the individual extraction paths inside a "dust grain" are maintained very small. This requires complex filtering steps, which are expensive in terms of process engineering and which involve a substantial cost and time factor in an industrial application.

SUMMARY OF THE INVENTION

The present invention is a method of treating and processing alkaloid, oil and protein containing lupine seeds for the production of lupine seed products by means of selective fractioning in such a way that the proteins in purest form, as well as roughage, are freed of bitter principles as completely as possible, while the steps of operation to be realized in succession should involve the lowest possible industrial expenditure. On the one hand, particular attention is paid to the fact that the proteins to be treated must remain unchanged in their native form whereas enzymes contained in the lupine seeds are deactivated, and lipophilic alkaloids in particular are extracted most completely in the most gentle manner possible. The process comprises the simplest, mutually matched process steps for a substantial improvement of the degree of disembitterment of lupine seeds so far reached, or reducing the engineering expenditure substantially with the same result of disembitterment.

In accordance with the present invention, in the method of treating and processing alkaloid, oil and protein containing lupine seeds for the production of lupine seed products which are both rich, the go-called bitter lupines, or poor in bitter principles, by means of selective fractioning, the following steps of method are performed:

Initially, the lupine seeds are husked and the husks are separated. It is particularly advantageous for the further steps of the method to screen the lupine seeds by shape and size either before or during husking. For this operation screens of an appropriate mesh size may be used for realizing the screening operation. The husking operation is performed by a cold process in which the lupine seeds are halved and subsequently freed of their husks. Then the fleshy nuclei of the seeds are crushed or shaped, respectively, to form platelet-like flakes which are exposed in this form to an indirect introduction of heat while water is largely excluded. The flakes are preferably formed by means of flaking rollers which have a temperature below the denaturation temperature of the lupine proteins, i.e. less then 40° C.

Due to a gentle indirect introduction of heat, the enzymes contained in the lupine seeds are deactivated while the proteins largely retain their original shape and their functional properties because they do not come into direct contact with water, which would cause damage to the natural properties of the proteins.

In accordance with the present invention, the flakes are now subjected to a selective deoiling process in which a solvent is used, preferably hexane which allows for extraction of the lipids contained in the platelet-shaped flakes. In particular, the extracted lipids relate also to all lipophilic alkaloids contained in the lupine seeds, which can be isolated by de-oiling so that merely lipophobic alkaloids are still present as a result of bitter principles in the hexane-soaked platelet-shaped flakes, which must then be extracted in a subsequent disembitterment process. Then benzenes are preferably gently removed from the hexane-soaked meal, for instance by means of supercritical hexane.

What has turned out to be particularly expedient is an indirect thermal treatment of the de-oiled flakes, which may be performed, for instance, by means of a thermal pan.

For disembitterment the benzene-freed, lipid-reduced, platelet-shaped flakes are subjected to an aqueous fractioning process congisting substantially of two process steps:

Initially, the de-oiled flakes are introduced into an aqueous acidic medium where all those substances are dissolved which are contained in the flakes and can be dissolved in the acidic range. As a results an aqueous acid extract is obtained which contains particularly the alkaloids as well as a disembittered refined product, insoluble in the acidic range, which consists substantially of flake material.

The flakes so extracted, which are also referred to as meal, can then be subjected to a further subsequent extraction which aims at the production of isolated proteins or concentrations, respectively. In the subsequent extraction, too, aqueous systems are involved which can be joined in several successive stages. The solid and liquid phases can be separated by means of decantation which furnishes the protein extract as well as protein-depleted extracts or their compartments as product, with the protein traction remaining in the remaining flake substance being capable of being controlled by means of specific process conditions such as the pH level, extraction periods and temperatures.

When the refined product which is insoluble in acids is introduced into an aqueous alkaline medium in which all those substances are dissolved which dissolve in the alkaline range, i.e. at pH levels higher than 7.5, an alkaloid-reduced refined product is obtained as a final result, which is available immediately after the second process step, which refined product is free of both any lipophilic alkaloids and alkaloids soluble in the acidic range.

BRIEF DESCRIPTION OF THE DRAWINGS

The invention will be described in the following, without any restriction of the general inventive idea, by exemplary embodiments with reference to the drawing wherein.

DESCRIPTION OF THE PREFERRED EMBODIMENTS

Figure 1:
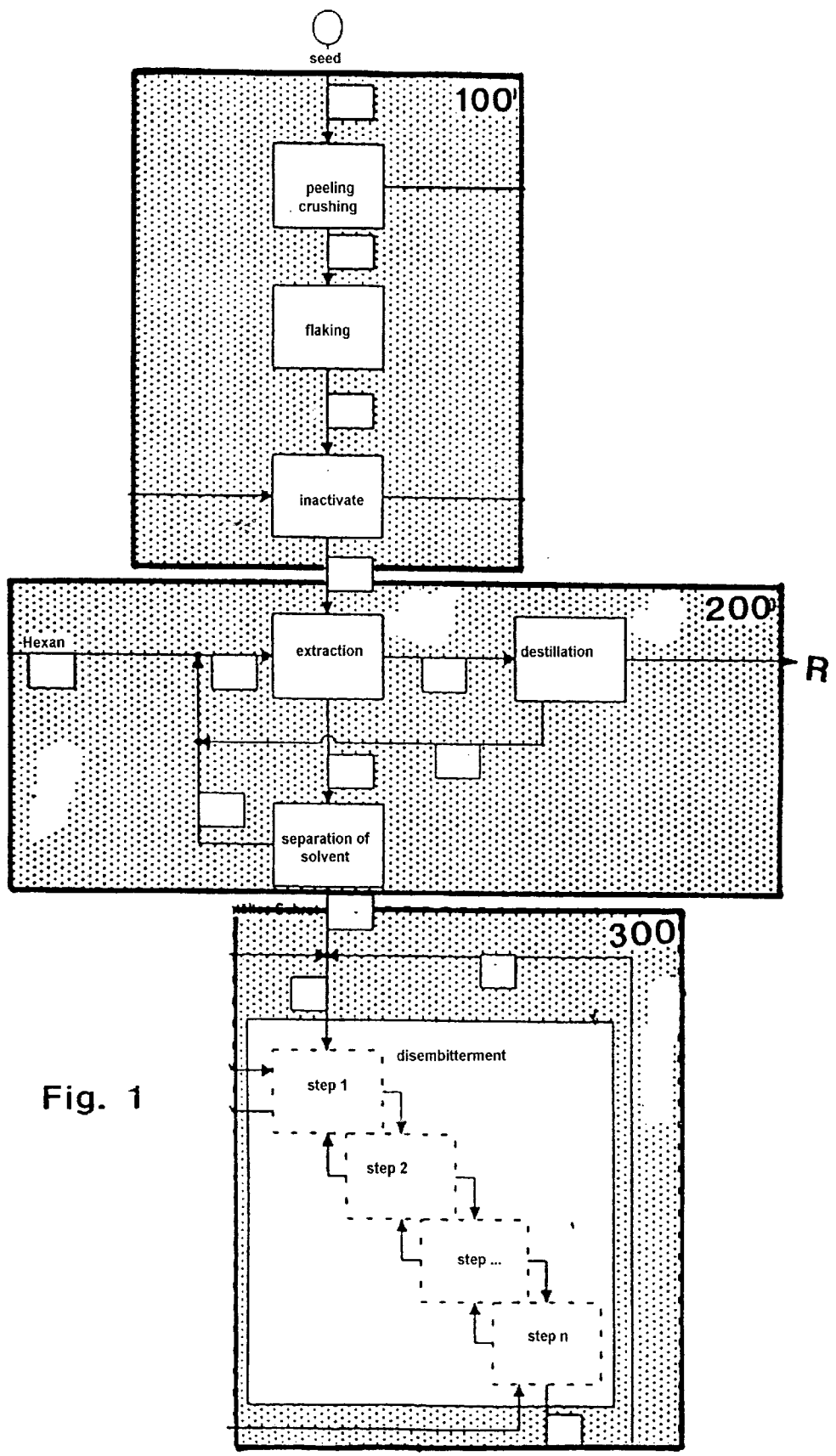
FIGS. 1, 2 represent a schematic view of the process for de-oiling and disembitterment of alkaloid-containing lupine seeds.

FIG. 1 is a schematic block diagram of the first 3 steps of the process of the invention. In the first step 100 the lupine seeds are prepared, in the second process step 200 de-oiling is performed, and disembitterment takes place in the third process step 300.

Lupine seeds as raw material are the starting point of the process, which are crushed and husked in a preparation step. The lupine seeds, which are singled out in this manner, are then shaped into flakes, preferably in a subsequent rolling operation, which means that the lupine seeds are pressed to form seed fragments which have a typical platelet thickness between 300 and 400 $\mu$m. As early as during the rolling operation, heat can be selectively and indirectly introduced into the lupine seeds by heating the employed rolling rollers. Moreover, thermal pans can be used onto which the lupine seeds may arrive. As a result of this thermal heat introduction naturally occurring enzymes in the sees are deactivated so that later enzymatic fat oxidation processes, which may lead to rancid flavors, can be precluded. The lupine seeds, which are shaped to form flakes and which have moreover been enzymatically deactivated, are now transferred to a subsequent de-oiling process 200 in which the flakes are exposed to hexane as solvent for the extraction of any lipophilic substances such as triglycerins and crude lecithins, but particularly lipophilic alkaloids. This is typically done in a belt type or rotary extractor. The liquid phase is subjected to a distillation process in which firstly the used solvent hexane is recovered and made available for reuse, and secondly the extracted crude oil R can be purified in a further refining operation which is not illustrated in the FIG. 1. Moreover, the refinement of the crude lecithins can be continued by using acetone.

The hexane-soaked deoiled flakes, which are present after the extraction process in the deoiling step 200, are isolated from the solvent as gently as possible, i.e. solvent is removed therefrom. In this process it is particularly essential that the solubility of the proteins is retained as far as this is possible on an industrial scale, or can be selectively modified, respectively. To this end the hexane-soaked flakes have solvent removed under low-water conditions. e.g. by using an overheated solvent. The resultant deoiled flaky lupine seeds are now freed of any alkaloids still contained in the lupine seeds in a disembitterment process 300. Lupine disembitterment is performed, in a manner known per se, in several stages in an aqueous disembitterment process in which the alkaloid extraction may take place continuously, quasi-continuously or discontinuously, as is shown in FIG. 1.

Initially, the de-coiled flakes are introduced into an acid medium in which all those substances and particularly alkaloids are dissolved which are soluble in an aqueous acid medium which has preferably a temperature lower than room temperature. This step of operation is performed in several stages, as can be seen in the disembitterment process 300 in FIG. 1. In each process stage, a respective isolation of the aqueous extract is performed, which is present in the stage from the refined product which is insoluble in the acidic range, preferably by centrifuging by means of a decanter. To this end, the decanter is cooled and flushed with water or the aqueous extract in a region of a solids trap.

The realization of a selective recycling of the aqueous extract from one process stage into the immediately preceding process stage and a supplementing or alternative selective discharge of the aqueous extract from a process stage for an increase of the concentration of the refined product which is insoluble in the acidic range has turned out to be especially advantageous for an improved isolation of the aqueous extract from the refined product which is insoluble in the acidic range.

For instance, it is possible to set selectively the ratio between the refined product which is insoluble in the acidic range and the aqueous extract to a value lower than 10:1 in a particular process stage, e.g. in the first stage, by admixing one part of the aqueous extract of the immediately successive process step, e.g. an aqueous extract from the second stage, so as to achieve a concentration of the components dissolved in the aqueous extract, which is as high as possible. Likewise the ratio between the refined product which is insoluble in the acidic range and the aqueous extract, e.g. in the second process stage, can be set to a level higher than 10:1 by separating in this process stage one part of the aqueous extract. Thus the concentration gradients of the components to be dissolved can be increased within the liquid phase while the extraction is accelerated. For the separation of one part of the aqueous extract, a current divider is used. The separated partial flow may be used for other applications or discarded.

Figure 2:
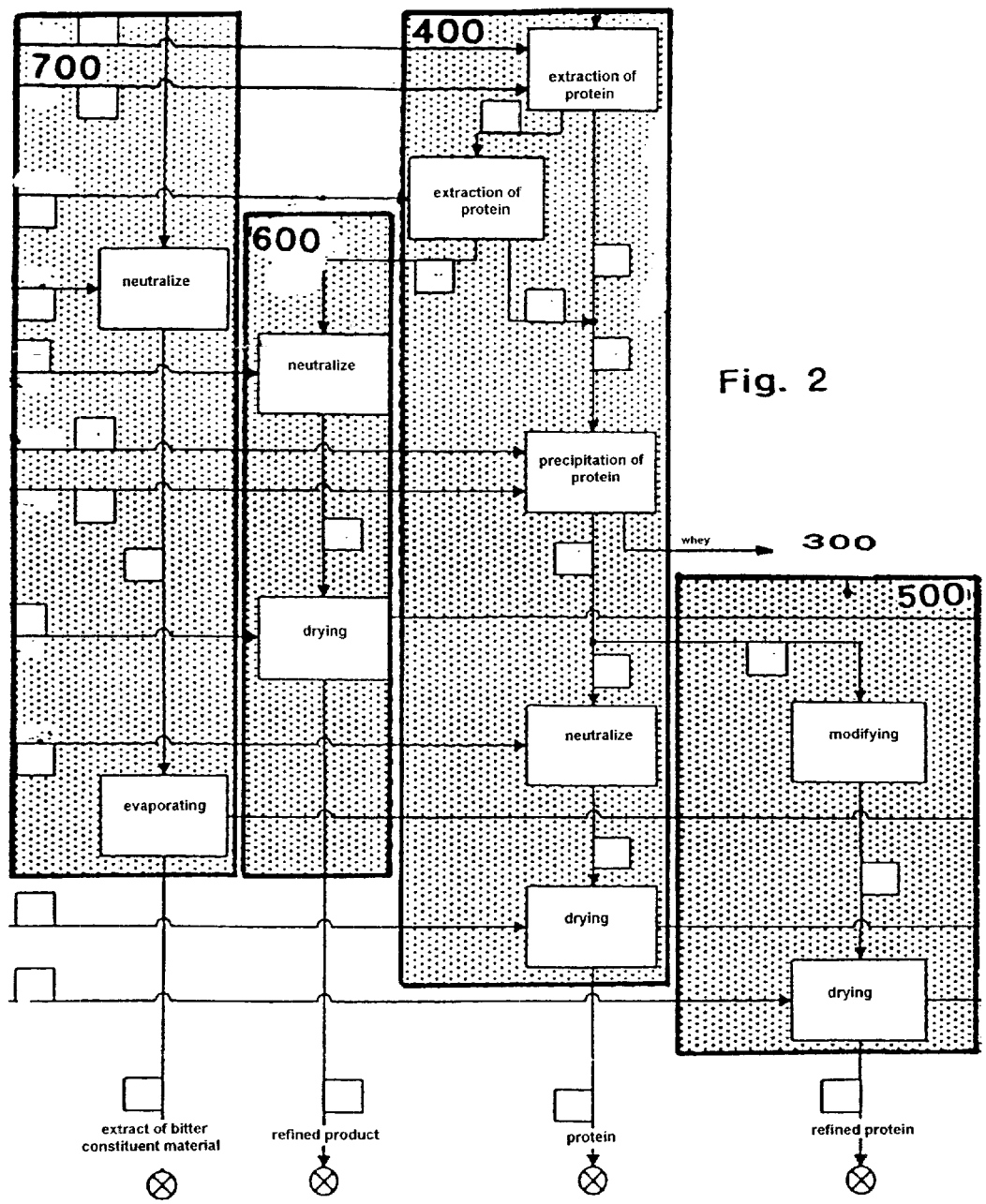

The processed flakes then arrive at the protein extraction stage 400 according to FIG. 2, in which the flakes are, for instance, exposed to an alkaline medium held at temperatures higher than room temperature, preferably between 35° C. and 45° C. while fractioning is performed between the refined product and the protein extracts. Protein precipitation from the protein extract can be performed in acidic media. The whey produced during protein precipitation, which has a pH level corresponding to that of the acidic medium for disembitterment of the lupine seeds within the disembitterment stage 300, may be recycled again to the disembitterment process 300 in a closed circuit. The whey produced during fractioning as well as the protein curds contain more than 85% protein in the solid state, with the whey being preferably produced by means of a decanter. Then the whey so produced is subjected to subsequent clarification in a separator and to a thermal treatment. The whey is preferably clarified a second time in a separator.

The whey so clarified twice is recycled into the process again, with the produced solids from the first separation in the protein strand being further processed while the solids produced in the second separation are separated.

The protein reduced residue is passed as substance flow to the roughage processing stage where a refined product is obtained in the region of the roughage processor 600 where the flakes are neutralized by appropriate supply of an acid and are then dried. On the other hand, the protein extract produced during the protein precipitation stage can furnish the protein product directly with an appropriate neutralization with the addition of alkaline media and a subsequent drying step. As an alternative, it is possible to modify the functional properties of parts of the protein extract in the process step 500 by an appropriate thermal treatment or the selective application of high frequency fields, thus resulting in a refined protein product after drying.

In addition to the achievement of the products of the refined product, which corresponds to the roughage, as well as the protein product's bitter principle extracts can be selectively derived from the disembitterment process, which products are produced in the form of an extract containing bitter principles, for instance, within the general framework of a bitter extract processing stage 700. To this end bitter extracts are separated selectively from the disembitterment process 300, which result in the final product after the appropriate treatment steps such as separation of fine substance, neutralization and concentration by evaporation.

It is also possible to mix the extract containing bitter principles with the husks re-moved in the process step 100. The extract so produced and fixed on husks can then be dried.

The essential aspect of the present inventive method of treating and processing alkaloid, oil and protein containing lupine seeds resides in the fact that the lipophilic alkaloids, which are very difficult to extract within the general framework of the generation process, have been eliminated from the lupine seeds already in a preceding de-oiling step. In this manner one can largely completely preclude that alkaloids are still present in the final products. The inventive crushing of the lupine seeds to form flakes equally contributes to the condition that firstly the bitter principles contained in the lupine seeds can completely escape from the seeds and that it is secondly possible to separate easily the liquid and solid phases in an operation without problems on an industrial scale. Moreover, the extraction behavior of the alkaloids in aqueous systems is substantially improved by elimination of the lipophilic seed components. This produces expedient effects particularly on the necessary dwelling times in the various extraction stages.

LIST OF REFERENCE NUMERALS

100 seed preparation, flake formation, deactivation
200 de-oiling
300 disembitterment
400 protein production
500 protein refinement
600 processing of the refined product
700 processing of the bitter principles

What is claimed is:

1. A method of treating and processing alkaloid, oil and protein containing lupine seeds for the production of lupine seed products by selective fractioning, comprising:

performing at least one of crushing and shaping the lupine seeds to form platelet-shaped flakes;

indirectly introducing heat into the platelet-shaped flakes, with water being essentially excluded, to deactivate enzymes contained in the lupine seeds;

de-oiling the platelet-shaped flakes by introduction of a solvent to obtain lipids and lipid-reduced flakes; and disembittering the lipid-reduced flakes by an aqueous process to obtain an alkaloid-reduced product and an aqueous extract.

2. The method according to claim 1, wherein the crushing of the lupine seeds is by roller after a pre-crushing of the lupine seeds.

3. The method according to claim 1, wherein the lupine seeds are screened by shape and size prior to the performing the at least one of crushing and shaping, and are subsequently husked.

4. The method according to claim 3, wherein the husking operation is performed with a cold process in which the seeds are halved and separated from husks.

5. The method according to claim 1, wherein the flake formation is by rollers having a temperature lower than a denaturation temperature of proteins contained in the lupine seeds.

6. The method according to claim 5, wherein the platelet-shaped flakes have a platelet thickness of less than 1 mm.

7. The method according to claim 1, wherein during indirect introduction of heat, proteins in the lupine seeds substantially retain native properties thereof.

8. The method according to claim 7, wherein the indirect introduction of heat is performed by pre-heated rollers which crush and heat the lupine seeds.

9. The method according to claim 1, wherein one of hexane, pentane, hexane, heptane and supercritical CO2 is used as solvent for the de-oiling of the platelet-shaped flakes.

10. The method according to claim 7, wherein the solvent is removed from the de-oiled platelet-shaped flakes under one of essentially low-water or water-free conditions.

11. The method according to claim 10, wherein the removal of solvent is performed with a heated solvent.

12. The method according to claim 7, wherein the indirect introduction of heat is performed by a thermal pan.

13. The method according to claim 1, wherein the disembittering process comprises:

introducing the lipid reduced flakes into an aqueous acidic medium for isolation of substances soluble in an acidic medium to obtain an aqueous extract and a product insoluble in an acidic range; and introducing the product insoluble in the acidic range into an aqueous alkaline medium to obtain aqueous extracts and products insoluble in alkaline and acidic ranges.

14. The method according to claim 13, wherein the aqueous acidic medium has a temperature lower than room temperature.

15. The method according to claim 13, wherein the isolation of the aqueous extract is performed by centrifuging using a decanter, and the decanter is cooled and flushed with one of water or the aqueous extract in a solids trap.

16. The method according to claim 13, wherein a temperature during extraction in the aqueous alkaline medium is higher than room temperature.

17. The method according to claim 13, wherein the introducing the lipid reduced flakes into an aqueous medium is performed in a multi-stage aqueous acidic process.

18. The method according to claim 17, wherein a ratio between the product insoluble in the acidic range and the aqueous extract at a level higher than 10:1 is set with one part of aqueous extract being separated within an immediately subsequent process step.

19. The method according to claim 13, wherein the obtaining of extracts is a closed circuit including the steps:

suspending the de-oiled flakes in water at a pH between 3.5–5.5 for extraction of alkaloids;

obtaining protein production by mixing the product insoluble in an acidic range with a lye at a pH level between 6.5 and 8.5;

separating a suspension into the product insoluble in an acidic range and a protein extract by a decanter;

applying an acidic medium to the protein extract to achieve a fractioning of whey and protein curds; and supplying the whey to the pre-extracted flakes at a pH between 3.5–5.5.

20. The method according to claim 19, wherein the separating of whey and protein curds contains more than 85% of the protein in the solids, and is performed by a decanter.

21. The method according to claim 20, wherein the whey is subjected to subsequent clarification by a separator, followed by a thermal treatment, and thereafter followed by a second clarification in a separator.

22. The method according to claim 21, wherein the twice clarified whey is recycled so that solids produced in a first separation are further processed in a second separation and the solids produced in the second separation are separated.

23. The method according to claim 20, wherein the protein production is performed at multiple pH levels to perform protein fractioning.

24. The method according to claim 20, wherein a residue has a protein percentage of less than 20% of solids, a roughage percentage is higher than 60%, and a percentage of soluble carbohydrates is lower than 5%.

25. The method according to claim 2, wherein husks are separated prior to de-oiling and are mixed with an alkaloid-containing aqueous extract extracted by pH levels between 3.5 and 5.5 and then dried.

26. The method according to claim 5 wherein:
the denaturation temperature is less than 40° C.

27. The method according to claim 6 wherein:
the platelet thickness is between 200–400 um.

28. The method according to claim 11 wherein:
the heated solvent is hexane.

29. The method according to claim 16 wherein:
the temperature is between 35° C. and 45° C.

30. The method according to claim 20 wherein:
more than 90% of protein is contained in the solids.

31. The method according to claim 24 wherein:
the roughage percentage is higher than 70% and the percentage of soluble carbohydrates is lower than 1%.

32. The method according to claim 1 wherein:
protein in the lupine seeds largely retains a shape thereof and functional properties thereof.

* * * * *